United States Patent
Kim et al.

(10) Patent No.: US 10,854,864 B2
(45) Date of Patent: Dec. 1, 2020

(54) SEPARATOR FOR LITHIUM SECONDARY BATTERY, AND LITHIUM SECONDARY BATTERY COMPRISING THE SAME

(71) Applicants: SK INNOVATION CO., LTD., Seoul (KR); SK IE TECHNOLOGY CO., LTD., Seoul (KR)

(72) Inventors: Yun Bong Kim, Daejeon (KR); Won Sub Kwack, Daejeon (KR); Hye Jin Kim, Daejeon (KR); Su Ji Lee, Daejeon (KR); Kyu Young Cho, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 16/543,994

(22) Filed: Aug. 19, 2019

(65) Prior Publication Data

US 2020/0067048 A1 Feb. 27, 2020

(30) Foreign Application Priority Data

Aug. 21, 2018 (KR) ......................... 10-2018-0097252

(51) Int. Cl.
*H01M 4/02* (2006.01)
*H01M 2/16* (2006.01)
*H01M 10/0525* (2010.01)

(52) U.S. Cl.
CPC ......... *H01M 2/166* (2013.01); *H01M 2/1653* (2013.01); *H01M 2/1686* (2013.01); *H01M 10/0525* (2013.01)

(58) Field of Classification Search
CPC ....................................................... H01M 4/02
See application file for complete search history.

(56) References Cited

U.S. PATENT DOCUMENTS

2010/0173187 A1\* 7/2010 Nishikawa .......... H01M 2/1653 429/129

FOREIGN PATENT DOCUMENTS

| WO | 2014179355 A1 | 11/2014 |
| WO | 2017213443 A1 | 12/2017 |

OTHER PUBLICATIONS

Extended European Search Report dated Dec. 6, 2019.

\* cited by examiner

*Primary Examiner* — Jacob B Marks
(74) *Attorney, Agent, or Firm* — IP & T Group LLP

(57) ABSTRACT

Provided are a separator for a lithium secondary battery and a lithium secondary battery comprising the same. The separator for a lithium secondary battery includes: a porous substrate; and a coating layer disposed on one side or both sides of the porous substrate and including a first inorganic particle and a second inorganic particle having different lengths of a major axis, and a binder, wherein a moisture content is less than 800 ppm after being left for 12 hours at a temperature of 40° C. and relative humidity of 90%.

14 Claims, No Drawings

SEPARATOR FOR LITHIUM SECONDARY BATTERY, AND LITHIUM SECONDARY BATTERY COMPRISING THE SAME

CROSS-REFERENCE TO RELATED APPLICATIONS

This application claims priority under 35 U.S.C. § 119 to Korean Patent Application No. 10-2018-0097252, filed on Aug. 21, 2018, in the Korean Intellectual Property Office, the disclosure of which is incorporated herein by reference in its entirety.

TECHNICAL FIELD

The following disclosure relates to a separator for a lithium secondary battery and a lithium secondary battery comprising the same.

BACKGROUND

A separator is a porous film positioned between a cathode and an anode of a battery, and provides a movement passage for lithium ions by impregnating an electrolyte into pores inside the film, and plays an important role in securing the safety of the battery as a subsidiary material which prevents internal short-circuit of the cathode and the anode even when a temperature of the battery is excessively high or an external impact is applied to the battery. A separator for secondary battery which has been most widely used up to now is a microporous thin film made of polyethylene, which is formed by increasing strength and thinning through stretching and making fine and uniform holes through phase separation with a plasticizer.

In recent years, as lithium secondary batteries have been increasingly used, there has been a strong demand for large-sized and high-capacity lithium secondary batteries. As the capacity of the secondary battery is increased, an area of an electrode plate is widened and many cathode or anode active materials are contained in the same area, resulting in a problem of battery safety.

There is a growing demand for improving the characteristics of the separator for electrical safety of the secondary battery. In the case of a lithium secondary battery, in order to improve the safety during a process of manufacturing the battery and a usage of the battery, high mechanical strength is required and high thermal stability is required.

For example, if the thermal stability of the separator is lowered, short-circuit may occur between the electrodes due to damage or deformation of the separator caused by temperature rise in the battery, and thus the risk of overheating or fire of the battery may increase.

In addition, the lithium secondary battery must be isolated from moisture because excessive moisture in the battery reacts with the electrolyte to cause electrolyte depletion and lead to deterioration of the active material to increase internal resistance of the battery, thereby greatly degrading the capacity and life characteristics of the battery.

SUMMARY

An embodiment of the present invention is directed to providing a separator for a lithium secondary battery capable of preventing degradation of performance of the battery such as capacity and lifetime characteristics of the lithium secondary battery while having very excellent thermal and mechanical stability and low moisture content.

Another embodiment of the present invention is directed to providing a lithium secondary battery comprising the separator for a lithium secondary battery.

In a general aspect, a separator for a lithium secondary battery includes: a porous substrate; and a coating layer disposed on one side or both sides of the porous substrate and including a first inorganic particle and a second inorganic particle having different lengths of a major axis, and a binder, wherein a moisture content is less than 800 ppm after being left for 12 hours at a temperature of 40° C. and relative humidity of 90%.

The moisture content may be less than 600 ppm or less after being left for 12 hours at a temperature of 40° C. and relative humidity of 90%.

A packing density of inorganic particles including the first inorganic particle and the second inorganic particle in the coating layer may be 1.40 $g/(m^2 \cdot \mu m)$ or more and 1.55 $g/(m^2 \cdot \mu m)$ or less.

The packing density may be 1.40 $g/(m^2 \cdot \mu m)$ or more and less than 1.4 $g/(m^2 \cdot \mu m)$.

A ratio of the length of the major axis of the first inorganic particle to the length of the major axis of the second inorganic particle may be 5 or more.

An aspect ratio of the first inorganic particle may be 5 or more, and an aspect ratio of the second inorganic particle may be 3 or more.

The length of the major axis of the first inorganic particle may be 1.6 μm or more, and the length of the major axis of the second inorganic particle may be 0.3 μm or more.

When the total amount of the inorganic particles in the coating layer is 100, a ratio of a content of the first inorganic particle to a content of the second inorganic particle may be from 45:55 to 55:45.

The Brunauer-Emmett-Teller (BET) specific surface area of the first inorganic particle may be 5 $m^2/g$ or more and 10 $m^2/g$ or less, and the BET specific surface area of the second inorganic particle may be 15 $m^2/g$ or more and 25 $m^2/g$ or less.

The first inorganic particle and the second inorganic particle may be amorphous inorganic particles.

The coating layer may include a total amount of the first inorganic particle and the second inorganic particle of 80 wt % or more and 99.5 wt % or less; and the binder of 0.5 wt % or more and 20 wt % or less for the total amount of the coating layer of 100 wt %.

The binder may include an acrylic polymer and a vinyl alcohol polymer.

A machine direction shrinkage (MD) at 160° C. may be 3.5% or less, and a transverse direction shrinkage (TD) may be 3% or less.

In another general aspect, a lithium secondary battery comprising the separator for a lithium secondary battery described above is provided.

DETAILED DESCRIPTION OF EMBODIMENTS

All terms (including technical and scientific terms) used in the present specification may be used as a meaning which is commonly understood by those skilled in the art to which the present invention pertains, unless otherwise defined. Throughout the present specification, unless explicitly described to the contrary, "comprising" any components will be understood to imply the inclusion of other elements rather than the exclusion of any other elements. Unless explicitly described to the contrary, a singular form includes a plural form.

An embodiment of the present invention provides a separator for a lithium secondary battery including a porous substrate; and a coating layer disposed on one side or both sides of the porous substrate and including a first inorganic particle and a second inorganic particle having different lengths of a major axis, and a binder.

The separator for a lithium secondary battery according to an embodiment of the present invention may have a moisture content of less than 800 ppm after being left for 12 hours at a temperature of 40° C. and relative humidity of 90%. Therefore, a problem that the moisture reacts with an electrolyte to cause electrolyte depletion and lead to deterioration of an active material to increase internal resistance of the battery, thereby greatly degrading a capacity and life characteristics of the battery, may be prevented.

In the separator for a lithium secondary battery according an embodiment of the present invention, for example, an amount of moisture to be re-impregnated at the time of water-based coating using water as a solvent in a formation of the coating layer is controlled to be very low, which may be very advantageous for lifetime characteristics of the battery.

The above-mentioned moisture contents of the separator for a lithium secondary battery according to an embodiment of the present invention may be more specifically 600 ppm or less.

In the separator of a lithium secondary battery according to an embodiment of the present invention, a ratio of the length of the major axis of the first inorganic particle to the length of the major axis of the second inorganic particle may be 5 or more.

The separator for a lithium secondary battery according to an embodiment of the present invention may have very excellent thermal and mechanical stability and low moisture content by including the first inorganic particle and the second inorganic particle having different lengths of the major axis and having the ratio of the length of the major axis of the first inorganic particle to the length of the major axis of the second inorganic particle (the length of the major of the first inorganic particle/the length of the major axis of the second inorganic particle) of 5 or more.

Therefore, damage on the separator and internal short-circuit of the battery may be prevented and stability of a process of manufacturing and using the lithium secondary battery may be greatly improved. Also, since the moisture content is small, degradation of the performance of the battery such as the capacity and lifetime characteristics of the lithium secondary battery caused by electrolyte depletion and deterioration of the electrode may be prevented.

When the ratio of the length of the major axis of the first inorganic particle to the length of the major axis of the second inorganic particle is less than 5, the mechanical stability of the separator may be much degraded, the moisture content may increase, and the thermal stability of the separator may also be much degraded.

An upper limit of the ratio of the length of the major axis of the first inorganic particle to the length of the major axis of the second inorganic particle may be 10, specifically 8, more specifically 6.

The separator for a lithium secondary battery according to an embodiment of the present invention may have a machine direction shrinkage (MD) at 160° C. of 3.5% or less, 3% or less, 2% or less, or 1% or less, and may have a transverse direction shrinkage (TD) of 3% or less, 2% or less, or 1% or less.

In the separator of a lithium secondary battery according to an embodiment of the present invention, an aspect ratio of the first inorganic particle may be 5 or more, and an aspect ratio of the second inorganic particle may be 3 or more. The aspect ratio of the first inorganic particle may be more specifically 5 or more and 7 or less, and the aspect ratio of the second inorganic particle may be more specifically 3 or more and 4 or less.

In the present specification, the aspect ratio means a ratio (A/B) of a length (A) of a major axis of a particle to a length (B) of a minor axis of the particle, and may be calculated by, for example, a scanning electron microscope (SEM) observation.

In addition, the length of the major axis of the first inorganic particle may be 1.0 μm or more, and the length of the major axis of the second inorganic particle may be 0.2 μm or more. The length of the major axis of the first inorganic particle may be more specifically 1.3 μm or more and 2.0 μm or less, and the length of the major axis of the second inorganic particle may be more specifically 0.2 μm or more and 0.5 μm or less.

More preferably, the length of the major axis of the first inorganic particle may be 1.6 μm or more, and the length of the major axis of the second inorganic particle may be 0.3 μm or more. The length of the major axis of the first inorganic particle may be more specifically 1.6 μm or more and 2.0 μm or less, and the length of the major axis of the second inorganic particle may be more specifically 0.3 μm or more and 0.5 μm or less.

By satisfying such a range of the aspect ratio and the length of the major axis, excellent thermal stability, mechanical stability, and low moisture content of the separator may be implemented.

In addition, a length of a minor axis of the first inorganic particle may be 0.1 μm or more and 0.4 μm or less, more specifically 0.2 μm or more and 0.3 μm or less, and a length of a minor axis of the second inorganic particle may be 0.05 μm or more and 0.2 μm or less, more specifically 0.1 μm or more and 0.2 μm or less.

On the other hand, in the separator of a lithium secondary battery according to an embodiment of the present invention, when the total amount of the inorganic particles in the coating layer is 100, a ratio of the content of the first inorganic particle to the content of the second inorganic particle (the content of the first inorganic particle:the content of the second inorganic particle) is from 30:70 to 70:30, more specifically from 45:55 to 55:45. More specifically, the ratio of the content of the first inorganic particle to the content of the second inorganic particle may be 50:50.

By satisfying such a range, excellent thermal stability, mechanical stability, and low moisture content of the separator may be implemented, and preferably, if such content ratios of the inorganic particles are satisfied together with the above-described aspect ratio and/or a preferable length range of the major axis, very excellent thermal stability may be additionally implemented.

The coating layer may contain a total amount of the first inorganic particle and the second inorganic particle of 80 wt % or more and 99.5 wt % or less; and the binder of 0.5 wt % or more and 20 wt % or less for the total amount of the coating layer of 100 wt %, more specifically, the total amount of the first inorganic particle and the second inorganic particle of 90 wt % or more and 99.5 wt % or less; and the binder of 0.5 wt % or more and 10 wt % or less, but is not necessarily limited thereto.

In the separator of a lithium secondary battery according to an embodiment of the present invention, the Brunauer-Emmett-Teller (BET) specific surface area of the first inorganic particle may be 5 m$^2$/g or more and 10 m$^2$/g or less, and the BET specific surface area of the second inorganic particle may be 15 m$^2$/g or more and 25 m$^2$/g or less.

More specifically, the BET specific surface area of the first inorganic particle may be 5 m$^2$/g or more and 8 m$^2$/g or less, and the BET specific surface area of the second inorganic particle may be 15 m$^2$/g or more and 20 m$^2$/g or less.

By satisfying such ranges, excellent thermal and mechanical stability and low moisture content of the separator may be implemented, but the present invention is not necessarily limited thereto.

In the separator of a lithium secondary battery according to an embodiment of the present invention, a packing density of inorganic particles including the first inorganic particle and the second inorganic particle in the coating layer may be 1.40 g/(m$^2$·μm) or more and 1.55 g/(m$^2$·μm) or less. Specifically, the packing density may be 1.40 g/(m$^2$·μm) or more and less than 1.48 g/(m$^2$·μm). More specifically, the packing density may be 1.42 g/(m$^2$·μm) or more and 1.46 g/(m$^2$·μm) or less.

The packing density of the inorganic particles in the coating layer is defined as the density (g/(m$^2$·μm)) of an inorganic coating layer loaded at a height of 1 μm per unit area (m$^2$) of the porous substrate, and may be calculated by reflecting a density and a usage fraction of each inorganic particle used, provided that there are two or more kinds of used inorganic particles.

In such a packing density range of the inorganic particles, uniform coating is possible and dense coating is possible, and excellent thermal and mechanical stability and low moisture content of the separator may thus be implemented.

In the separator of a lithium secondary battery according to an embodiment of the present invention, the first inorganic particle and the second inorganic particle may be amorphous inorganic particles. More specifically, the first inorganic particle and the second inorganic particle may be an angled amorphous shape. Here, the angled amorphous shape is not particularly limited as long as the particle is an angled shape, and may be selected from, for example, a polyhedral shape, a plate shape, and the like selected from a tetrahedron, a hexahedron, and an octahedron.

The first inorganic particle and the second inorganic particle may be inorganic particles of the same kind, may be inorganic particles of the same kind only partially, may all be different kinds of inorganic particles, and are not limited to a specific aspect.

In addition, the first inorganic particle and the second inorganic particle are not deformed by an external impact or force and do not undergo thermal deformation and side reactions even at high temperatures, and may be one or two or more inorganic particles selected from the group consisting of alumina, boehmite, aluminum hydroxide, titanium oxide, barium titanium oxide, magnesium oxide, magnesium hydroxide, silica, clay, and glass powder, but are not limited thereto.

Particle diameters of the first inorganic particle and the second inorganic particle are not necessarily limited thereto, but an average particle diameter (D50) of the first inorganic particle may be 1.0 μm or more and 2.0 μm or less, and the average particle diameter (D50) of the second inorganic particle may be 0.1 μm or more and 0.5 μm or less.

In the present specification, the average particle diameter (D50) represents a value measured as a volume average value D50 (that is, a particle diameter when a cumulative volume becomes 50%) in a particle size distribution measurement by a laser diffraction method.

By including the first inorganic particle and the second inorganic particle having the average particle diameters (D50) in the above range in the coating layer, the packing density of the coating layer is optimized and coating property is improved, thereby making it possible to form the coating layer having a uniform coating amount and a dense coating, and maximize the thermal stability and the mechanical stability.

In the separator for a lithium secondary battery according to an embodiment of the present invention, the binder may be a polymer binder. The polymer binder may serve to connect and stably fix the inorganic particles.

The polymer binder may include any one or a mixture of two or more selected from, for example, an acrylic polymer, a styrenic polymer, a vinyl alcohol polymer, a vinylpyrrolidone polymer, and a fluoropolymer. Specifically, the acrylic polymer may be selected from polyacrylamide, polymethacrylate, polyethylacrylate, polyacrylate, polybutylacrylate, sodium polyacrylate, acrylic acid-methacrylic acid copolymer, and the like. The styrenic polymer may be selected from polystyrene, poly alpha methyl styrene, polybromostyrene, and the like. The vinyl alcohol polymer may be selected from polyvinyl alcohol, polyvinyl acetate, polyvinyl acetate-polyvinyl alcohol copolymer, and the like. The vinylpyrrolidone polymer may be selected from polyvinylpyrrolidone, a copolymer including vinylpyrrolidone, and the like. The fluoropolymer may be any one or a mixture of two or more selected from polyvinylidene fluoride, polytetrafluoroethylene, polyhexafluoropropylene, hexafluoropropylene, polyfluoride-hexafluoropropylene, polychlorotrifluoroethylene, and the like, but is not limited thereto.

The polymer binder may more specifically include a mixture of an acrylic polymer and a vinyl alcohol polymer, and the present invention is not necessarily limited thereto, but in this case, the moisture content of the manufactured separator may be reduced, which is preferable.

In addition, when the polymer binder includes the mixture of the acrylic polymer and the vinyl alcohol polymer, the coating layer may contain the mixture of the acrylic polymer and the vinyl alcohol polymer of 0.5 wt % or more and 10 wt % or less for the total amount of the coating layer of 100 wt %. More specifically, the coating layer may contain the acrylic polymer of 0.3 wt % or more and 6 wt % or less and the vinyl alcohol polymer of 0.2 wt % or more and 4 wt % or less for the total amount of the coating layer of 100 wt %.

A thickness of the coating layer is not limited as long as the object of the present invention is achieved. For example, the thickness of the coating layer may be formed at 1 μm or more and 20 μm or less, and preferably 1 μm or more and 15 μm or less, on one surface or both surfaces of the porous substrate, and in the above range, heat resistance may be ensured and ion permeability is relatively excellent, so that the capacity of the battery may be improved.

The porous substrate layer may be used without being limited as long as it is a microporous film adopted in the art such as a polyolefin-based resin, and is not particularly limited as long as it is a porous film that may be applied to the lithium secondary battery including inorganic particles in internal pores or surfaces of the microporous films.

The polyolefin-based resin is preferably one or more polyolefin-based resins alone or a mixture thereof and is preferably one or two or more selected from the group consisting of polyethylene, polypropylene, and copolymers thereof. In addition, the substrate layer may also be manufactured of the polyolefin resin alone or the polyolefin resin as a main component and further including inorganic particles or organic particles. In addition, the substrate layer may be used in a stacked form, for example, the polyolefin-based resin may be composed of multiple layers, and the substrate layer composed of the multiple layers also does not exclude that any one or all of the layers include the inorganic particles and the organic particles in the polyolefin resin.

A thickness of the porous substrate layer is not particularly limited, but may preferably be 5 μm or more and 30 μm or less. The porous substrate layer may be a porous polymer film mainly formed by stretching, but is not limited thereto.

The separator for a lithium secondary battery according to an embodiment of the present invention may be manufactured by a manufacturing method including an operation of applying a slurry including a first inorganic particle and a second inorganic particle having different lengths of a major axis, and a binder on a porous substrate; and an operation of drying the slurry.

Through the manufacturing method, it is possible to form a coating layer with a very uniform and excellent coating property on the porous substrate, and it is possible to manufacture a separator for a lithium secondary battery capable of preventing deterioration of performance of the battery because thermal stability and mechanical stability are excellent and a moisture content is small.

In the operation of applying the slurry including the first inorganic particle and the second inorganic particle having different length of the major axis, and the binder on the porous substrate, a coating layer may be formed on one side or both sides by applying the slurry one side or both sides of the porous substrate.

Here, a detailed description of the same contents as those described above such as the specific kinds of the first inorganic particle, the second inorganic particle, and the binder, the mixing amount, the thickness of the coating layer, the thickness of the porous substrate, and the like is omitted.

The slurry in the operation of applying the slurry including the first inorganic particle and the second inorganic particle having different length of the major axis, and the binder on the porous substrate may further include a solvent, and the solvent may be, but is not particularly limited to, for example, one or more selected from the group consisting of water, methanol, ethanol, 2-propanol, acetone, tetrahydrofuran, methyl ethyl ketone, ethyl acetate, N-methylpyrrolidone, dimethylacetamide, dimethylformamide, dimethylformamide, and the like. More specifically, the slurry may be water, and even though the separator for a lithium secondary battery according to an embodiment of the present invention is manufactured by a water-based coating method, the separator may contain very small moisture of less than 800 ppm, more specifically, less than 600 ppm.

In the manufacturing method, the method of applying the coating layer slurry to the porous substrate is not particularly limited as long as it may employ the ordinary method adopted in this field, and as an example, a bar coating method, a rod coating method, a die coating method, a wire coating method, a comma coating method, a micro gravure/gravure method, a dip coating method, spray method, an ink-jet coating method, a mixed method thereof, and a modified method thereof may be used.

A drying temperature in the operation of drying the slurry is not particularly limited, but may be 45° C. or more and 100° C. or less, more specifically, 45° C. or more and 80° C. or less. When drying at the drying temperature, coating failure may be prevented by drying the coating layer uniformly without affecting physical properties of the porous substrate.

In addition, the operation of drying the slurry is an operation of drying the solvent of the coating layer slurry formed on the porous substrate to finally form the coating layer. As a specific method of the drying, the drying may be performed by passing the porous substrate applied with the coating layer slurry through a drier having a length of 6 m at a rate of 5 m/min to produce a hot air at 60° C., but is not limited thereto, and an appropriate drying method may be adopted.

Another embodiment of the present invention provides a lithium secondary battery comprising the separator for a lithium secondary battery according to the embodiment of the present invention. The lithium secondary battery may include the separator according to an embodiment of the present invention, a cathode, an anode, and a non-aqueous electrolyte.

The description of the separator is as described above and will be omitted.

The cathode and the anode may be manufactured by mixing and stirring a solvent, a binder, a conductive material, and the like in a cathode active material and an anode active material to manufacture a compound, applying the compound to a collector of a metallic material, drying, and then pressing.

The cathode active material may be used as long as it is an active material conventionally used for the cathode of the secondary battery. For example, lithium metal oxide particles including one or two or more metals selected from the group consisting of Ni, Co, Mn, Na, Mg, Ca, Ti, V, Cr, Cu, Zn, Ge, Sr, Ag, Ba, Zr, Nb, Mo, Al, Ga, B, and a combination thereof may be used. However, the present invention is not limited thereto.

The anode active material may be used as long as it is an active material conventionally used for the anode of the secondary battery. The anode active material of the lithium secondary battery is preferably a material capable of lithium intercalation. In one non-limiting embodiment, the anode active material is one or two or more materials selected from the anode active material group consisting of lithium (metal lithium), soft carbon, hard carbon, graphite, silicon, Sn alloy, Si alloy, Sn oxide, Si oxide, Ti oxide, Ni oxide, Fe oxide (FeO), and lithium-titanium oxide ($LiTiO_2$, $Li4Ti_5O_{12}$). However, the present invention is not limited thereto.

The conductive material is used for imparting conductivity to the electrode. Any conductive material may be used as long as it does not cause any chemical change in the configured battery and is an electronic conductive material. As an example thereof, the conductive material including carbon-based materials such as natural graphite, artificial graphite, carbon black, acetylene black, ketjen black, carbon fiber, and carbon nanotube; metal powders such as copper, nickel, aluminum, and silver, or metal-based materials such as metal fibers; conductive polymers such as polyphenylene derivatives; or a mixture thereof may be used. However, the present invention is not limited thereto.

As the binder, polyvinyl alcohol, carboxymethyl cellulose, hydroxypropyl cellulose, diacetyl cellulose, polyvinyl chloride, carboxylated polyvinyl chloride, polyvinyl fluoride, polymers containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like may be used, but the present invention is not limited thereto.

The collector of the metal material is a metal having high conductivity and easily adhered to the compound of the cathode or anode active material, and any collector may be used as long as it is not reactive in a voltage range of the battery. Non-limiting examples of the cathode collector include foil manufactured by aluminum, nickel, or a combination thereof, and non-limiting examples of the anode collector include foil manufactured by copper, gold, nickel, copper alloy, or a combination thereof.

A separator is interposed between the cathode and the anode. As a method of applying the separator to the battery, lamination (stacking) and folding of the separator and electrodes may be used in addition to winding, which is a general method.

The non-aqueous electrolyte includes a lithium salt, which is an electrolyte, and an organic solvent. The lithium salt may be used without limitation as those conventionally used in an electrolyte for a lithium secondary battery, and may be expressed by $Li^+X^-$.

Anions of the lithium salt are not particularly limited and for example, any one or two or more of $F^-$, $Cl^-$, $Br^-$, $I^-$, $NO^{3-}$, $N(CN)^{2-}$, $BF^{4-}$, $ClO^{4-}$, $PF^{6-}$, $(CF_3)_2PF^{4-}$, $(CF_3)_3PF^{3-}$, $(CF_3)_4PF^{2-}$, $(CF_3)_5PF^-$, $(CF_3)_6P^-$, $CF_3SO^{3-}$, $CF_3CF_2SO^{3-}$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO^{3-}$, $CF_3CO^{2-}$, $CH_3CO^{2-}$, $SCN^-$, and $(CF_3CF_2SO_2)_2N^-$ may be used.

As the organic solvent, any one selected from the group consisting of propylene carbonate, ethylene carbonate, diethyl carbonate, dimethyl carbonate, ethylmethyl carbonate, methylpropyl carbonate, dipropyl carbonate, dimethylsulfuroxide, acetonitrile, dimethoxyethane, diethoxyethane, sulfolane, gamma-butyrolactone, and tetrahydrofuran, or a mixture of two or more thereof may be used.

The non-aqueous electrolyte may be injected into an electrode structure including the cathode, the anode, and the separator interposed between the cathode and the anode.

An external shape of the lithium secondary battery is not particularly limited, but may be a cylindrical shape, a square shape, a pouch shape, a coin shape, or the like using a can.

Hereinafter, examples and comparative examples of the present invention will be described. However, the following example is only an embodiment of the present invention, and the present invention is not limited to the following example.

Thermal Shrinkage Measurement

In a method of measuring thermal shrinkage of the separator at 160° C., the separator is cut into a square shape having a side length of 10 cm to prepare a sample, and the sample before measurement is measured and recorded using a camera. Five sheets of A4 paper are placed at the top and bottom of the sample so that the sample is in the center, and four sides of the paper are fixed with clips. The sample wrapped in the paper was left in a hot air drying oven at 160° C. for 1 hour. After the sample was left for 1 hours, the sample was taken out and the sample was measured with the camera to calculate a machine direction shrinkage (MD) of the following Equation 1 and a transverse direction shrinkage (TD) of the following Equation 2.

Machine Direction Shrinkage (%)=(Machine Direction Length Before Heating–Machine Direction Length After Heating)×100/Machine Direction Length Before Heating     [Equation 1]

Transverse Direction Shrinkage (%)=(Transverse Direction Length Before Heating–Transverse Direction Length After Heating)×100/Transverse Direction Length Before Heating     [Equation 2]

Packing Density

A packing density of the coating layer is defined as density ($g/(m^2 \cdot \mu m)$) of an inorganic coating layer loaded at a height of 1 µm per unit area ($m^2$) of the porous substrate, and was calculated by reflecting a density and a usage fraction of each inorganic particle used, provided that there are two or more kinds of used inorganic particles.

Moisture Content Measurement

In order to measure the content of moisture contained in the separator, Karl Fischer moisture determination method was used. As the measurement equipment, 831 KFC Coulometer and 885 Compact Oven manufactured by Metrohm were used, and the measurement conditions were as follows: a sample weight of the separator was 0.3 g; an oven temperature was 150° C.; and a measurement time was 600 seconds.

Specifically, the manufactured separator was left for 12 hours under conditions of high temperature and high humidity (40° C., relative humidity 90%), and the moisture content was measured under the same conditions as above.

Penetration Evaluation

In order to measure the safety of the battery, each manufactured battery was fully charged with state of charge (SOC) of 100%, and a nail penetration evaluation was performed. At this time, a diameter of the nail was 3.0 mm, and a penetration speed of the nail was fixed at 80 mm/min. L1 is determined as no change, L2 is slight heat generation, L3 is leakage, L4 is fuming, L5 is ignition, L1 to L3 are OK, and L4 and L5 are NG.

Appearance Evaluation after Coating

After coating and drying, the appearance was evaluated as follows.

●: no wire bar mark after drying

▲: after drying, wire bar mark is minutely present (middle level or less),

X: visibility to wire bar mark after drying is high level

Example and Comparative Example (1) Manufacturing of Cathode

A uniform cathode slurry was manufactured by adding and stirring $LiCoO_2$ of 94 wt % as a cathode active material, polyvinylidene fluoride of 2.5 wt % as an adhesive, and Super-P (manufactured by Imerys) of 3.5 wt % as a conductive agent to N-methyl-2-pyrrolidone (NMP), which is an organic solvent. The slurry was coated on an aluminum foil having a thickness of 30 µm, dried at a temperature of 120° C., and pressed to manufacture a cathode plate having a thickness of 150 µm.

(2) Manufacturing of Anode

A uniform anode slurry was manufactured by adding and stirring artificial graphite of 95 wt % as an anode active material, acrylic latex (ZEON, BM900B, solid content of 20 wt %) of 3 wt % having $T_g$ of −52° C. as an adhesive, and carboxymethyl cellulose (CMC) of 2 wt % as a thickener to water, which is a solvent. The slurry was coated on a copper foil having a thickness of 20 µm, dried at a temperature of 120° C., and pressed to manufacture an anode plate having a thickness of 150 µm.

(3) Manufacturing of Separator

Amorphous boehmite particles were used as an inorganic substance, and 100 parts by weight of water and 50 parts by weight of a mixture of inorganic particles and a binder as shown in Table 1 were mixed and stirred to manufacture a coating layer slurry. As the binder, polyvinyl alcohol (PVA) having a melting temperature of 220° C. and a saponification degree of 99% and acrylic latex having a $T_g$ of −52° C. (ZEON, BM900B, solid content of 20 wt %) were used.

As the porous substrate, polyolefin microporous film product (SK Innovation, ENPASS) having a thickness of 12 µm was used, and the coating layer slurry was applied on an end surface of the substrate at a speed of 10 m/min using a wire bar, dried at a speed of 5 m/min through a drier having a length of 6 m, through which hot air at 55° C. was discharged through the drier, followed by winding in the form of a roll.

A thickness of the coating layer was 4 µm.

(4) Manufacturing of Battery

A pouch-type battery was assembled by stacking the manufactured cathode and anode, and the separator manufactured in the examples and the comparative examples, and an electrolyte of ethylene carbonate (EC)/ethylmethyl carbonate (EMC)/dimethyl carbonate (DMC)=3:5:2 (volume ratio) in which 1 M of lithium hexafluorophosphate ($LiPF_6$) was dissolved was injected into each assembled battery to manufacture a lithium secondary battery.

TABLE 1

| Classification | First Inorganic Particle | Second Inorganic Particle | Binder | Thickness of Coating |
|---|---|---|---|---|
| Example 1 | Major Axis: 1.7 Minor Axis: 0.3 Content: 47 wt % BET: 8 m²/g | Major Axis: 0.3 Minor Axis: 0.1 Content: 47 wt % BET: 17 m²/g | PVA 2 wt % Acryl latex 4 wt % | One side of 4 μm |
| Example 2 | Major Axis: 1.7 Minor Axis: 0.3 Content: 63 wt % BET: 8 m²/g | Major axis: 0.3 Minor Axis: 0.1 Content: 31 wt % BET: 17 m²/g | PVA 2 wt % Acryl latex 4 wt % | One side of 4 μm |
| Example 3 | Major Axis: 1.7 Minor Axis: 0.3 Content: 31 wt % BET: 8 m²/g | Major Axis: 0.3 Minor Axis: 0.1 Content: 63 wt % BET: 17 m²/g | PVA 2 wt % Acryl latex 4 wt % | One side of 4 μm |
| Example 4 | Major Axis: 1.5 Minor Axis: 0.2 Content: 47 wt % BET: 10 m²/g | Major Axis: 0.2 Minor Axis: 0.1 Content: 47 wt % BET: 23 m²/g | PVA 2 wt % Acryl latex 4 wt % | One side of 4 μm |
| Comparative Example 1 | Major Axis: 0.7 Minor Axis: 0.2 Content: 47 wt % BET: 11 m²/g | Major Axis: 0.3 Minor Axis: 0.1 Content: 47 wt % BET: 17 m²/g | PVA 2 wt % Acryl latex 4 wt % | One side of 4 μm |
| Comparative Example 2 | — | Major Axis: 0.3 Minor Axis: 0.1 Content: 94 wt % BET: 17 m²/g | PVA 2 wt % Acryl latex 4 wt % | One side of 4 μm |
| Comparative Example 3 | Major Axis: 1.7 Minor Axis: 0.3 Content: 94 wt % BET: 8 m²/g | — | PVA 2 wt % Acryl latex 4 wt % | One side of 4 μm |
| Comparative Example 4 | Major Axis: 0.7 Minor Axis: 0.2 Content: 94 wt % BET: 11 m²/g | — | PVA 2 wt % Acryl latex 4 wt % | One side of 4 μm |
| Comparative Example 5 | Major Axis: 1.7 Minor Axis: 0.3 Content: 47 wt % BET: 8 m²/g | Major Axis: 0.3 Minor Axis: 0.1 Content: 47 wt % BET: 17 m²/g | PVA 6 wt % | One side of 4 μm |
| Comparative Example 6 | Major Axis: 1.2 Minor Axis: 0.3 Content: 47 wt % BET: 10 m²/g | Major Axis: 0.3 Minor Axis: 0.1 Content: 47 wt % BET: 17 m²/g | PVA 2 wt % Acryl latex 4 wt % | One side of 4 μm |

In Table 1, wt % means the weights of each component when the total amount of the first inorganic particles, the second inorganic particles, and the binder is 100% by weight.

In Table 1, the unit of major axis and minor axis is μm.

Thermal shrinkage of the separator manufactured in the examples and the comparative examples, packing density of inorganic particles, moisture content, and penetration characteristics of the lithium secondary battery were evaluated and summarized in Table 2 below.

TABLE 2

| Classification | Thermal Shrinkage (@160° C.) MD/TD (%) | Appearance Evaluation After Coating | Packing Density (g/(m²·μm)) | Moisture Content (40° C./90% RH measured after being left for 12 hours) | Penetration Characteristics |
|---|---|---|---|---|---|
| Example 1 | 0.8/0.5 | ● | 1.45 | 543 ppm | OK |
| Example 2 | 3.1/2.7 | ● | 1.42 | 470 ppm | OK |
| Example 3 | 1.4/1.7 | ▲ | 1.46 | 600 ppm | OK |
| Example 4 | 2.1/2.6 | ▲ | 1.43 | 584 ppm | OK |
| Comparative Example 1 | 23/26 | ▲ | 1.58 | 900 ppm | NG |
| Comparative Example 2 | 2.2/2.6 | X | 1.75 | 1400 ppm | OK |
| Comparative Example 3 | 48/52 | ● | 1.12 | 800 ppm | NG |
| Comparative Example 4 | 39/42 | ▲ | 1.57 | 940 ppm | NG |
| Comparative Example 5 | 11/15 | ▲ | 1.48 | 930 ppm | NG |
| Comparative Example 6 | 13/18 | ▲ | 1.38 | 850 ppm | NG |

In the case of the separators of the examples, although the water-based coating was applied thereto, the moisture content was 600 ppm or less, which is very low.

In addition, in the examples in which the lengths of the major axis are different from each other and the ratio of the lengths of the major axis is 5 or more, the thermal shrinkage at 160° C. was small and excellent thermal stability was exhibited, and further, the lithium secondary battery including the separator of the examples exhibited excellent mechanical stability.

In addition, in the examples, the packing density of the inorganic particles in the coating layer satisfies 1.40 g/(m²·μm) or more and less than 1.48 g/(m²·μm), and in this case, it was confirmed that the moisture content and the mechanical stability were very low.

On the other hand, in the comparative examples 1 and 6 in which the ratio of the major axis of the two inorganic particles was less than 5, and the comparative examples 2 to 4 in which the single inorganic particles were used, the moisture content was high and the mechanical stability was extremely poor. In addition, the thermal stability was also poor. In the case of the comparative example 2, the mechanical stability was relatively excellent, but the coating property was poor and the moisture content was very high.

Meanwhile, in the case of the example 1 in which the aspect ratio of the first inorganic particle is 5 or more and the aspect ratio of the second inorganic particle is 3 or more, or the length of the major axis of the first inorganic particle is 1.6 μm or more and the length of the major axis of the second inorganic particle is 0.3 μm or more, and the content ratio of the two inorganic particles is 45:55 to 55:45 when the total amount of the inorganic particles is 100, low moisture content, excellent mechanical stability and relatively very excellent thermal stability were exhibited.

Since the separator for a lithium secondary battery according to an embodiment of the present invention has very excellent thermal and mechanical stability, the damage on the separator and the internal short-circuit of the battery may be prevented, and the stability of the process of manufacturing and using the lithium secondary battery may be very improved.

In addition, since the separator for a lithium secondary battery according to an embodiment of the present invention has the small moisture content, the deterioration of the performance of the battery such as the capacity and lifetime characteristics of the lithium secondary battery caused by the electrolyte depletion and degradation of the electrode may be prevented.

In addition, another embodiment of the present invention may provide a lithium secondary battery comprising the separator for a lithium secondary battery.

What is claimed is:

1. A separator for a lithium secondary battery, comprising:
a porous substrate; and
a coating layer disposed on one side or both sides of the porous substrate and including a first inorganic particle and a second inorganic particle having different lengths of a major axis, and a binder,
wherein a moisture content is less than 800 ppm after being left for 12 hours at a temperature of 40° C. and relative humidity of 90%.

2. The separator for a lithium secondary battery of claim 1, wherein the moisture content is less than 600 ppm or less after being left for 12 hours at a temperature of 40° C. and relative humidity of 90%.

3. The separator for a lithium secondary battery of claim 1, wherein a packing density of inorganic particles including the first inorganic particle and the second inorganic particle in the coating layer is 1.40 g/(m²·μm) or more and 1.55 g/(m²·μm) or less.

4. The separator for a lithium secondary battery of claim 3, wherein the packing density of the inorganic particles including the first inorganic particle and the second inorganic particle is 1.40 g/(m²·μm) or more and less than 1.48 g/(m²·μm).

5. The separator for a lithium secondary battery of claim 1, wherein a ratio of the length of the major axis of the first inorganic particle to the length of the major axis of the second inorganic particle is 5 or more.

6. The separator for a lithium secondary battery of claim 1, wherein an aspect ratio of the first inorganic particle is 5 or more, and an aspect ratio of the second inorganic particle is 3 or more.

7. The separator for a lithium secondary battery of claim 1, wherein the length of the major axis of the first inorganic particle is 1.6 μm or more, and the length of the major axis of the second inorganic particle is 0.3 μm or more.

8. The separator for a lithium secondary battery of claim 1, wherein when the total amount of the inorganic particles in the coating layer is 100, a ratio of a content of the first inorganic particle to a content of the second inorganic particle is from 45:55 to 55:45.

9. The separator for a lithium secondary battery of claim 1, wherein the Brunauer-Emmett-Teller (BET) specific surface area of the first inorganic particle is 5 m²/g or more and 10 m²/g or less, and the BET specific surface area of the second inorganic particle is 15 m²/g or more and 25 m²/g or less.

10. The separator for a lithium secondary battery of claim 1, wherein the first inorganic particle and the second inorganic particle are amorphous inorganic particles.

11. The separator for a lithium secondary battery of claim 1, wherein the coating layer includes a total amount of the first inorganic particle and the second inorganic particle of 80 wt % or more and 99.5 wt % or less; and the binder of 0.5 wt % or more and 20 wt % or less for the total amount of the coating layer of 100 wt %.

12. The separator for a lithium secondary battery of claim 1, wherein the binder includes an acrylic polymer and a vinyl alcohol polymer.

13. The separator for a lithium secondary battery of claim 1, wherein a machine direction shrinkage (MD) at 160° C. is 3.5% or less, and a transverse direction shrinkage (TD) is 3% or less.

14. A lithium secondary battery comprising the separator for a lithium secondary battery of claim 1.

* * * * *